Jan. 7, 1969  E. ZILLMER  3,419,980

MAGAZINE ADVANCING STRUCTURE FOR PHOTOGRAPHIC PROJECTORS

Filed Feb. 28, 1966

United States Patent Office 3,419,980
Patented Jan. 7, 1969

3,419,980
MAGAZINE ADVANCING STRUCTURE FOR PHOTOGRAPHIC PROJECTORS
Erich Zillmer, Braunschweig, Germany, assignor to Voigtlander A.G., Braunschweig, Germany, a corporation of Germany
Filed Feb. 28, 1966, Ser. No. 530,533
Claims priority, application Germany, Mar. 8, 1965, Z 11,390
U.S. Cl. 40—79        6 Claims
Int. Cl. G09f 11/30; F16h 3/34

ABSTRACT OF THE DISCLOSURE

Magazine advancing structure for photographic projectors. The photographic projector is provided with a magazine means which carries a toothed means by which the magazine means is advanced. A driven gear means meshes with this toothed means while a driving gear means which is not directly connected to the driven gear means is provided for driving the driven gear means. Between the driving and driven gear means there is an adjustable transmission means which coacts with the driving and driven gear means for transmitting a drive therebetween at a selected one of a plurality of different transmission ratios. In this way it is possible to feed the magazine means at increments corresponding to the spacing between magazine compartments in which slides are respectively located. Thus, where thin slides in narrow compartments are provided, the increments will be relatively small whereas with thicker slides the increments will be larger, and through the adjustable transmission means the drive of driven gear means can be adapted to magazines having different compartment sizes.

---

Figure 1:
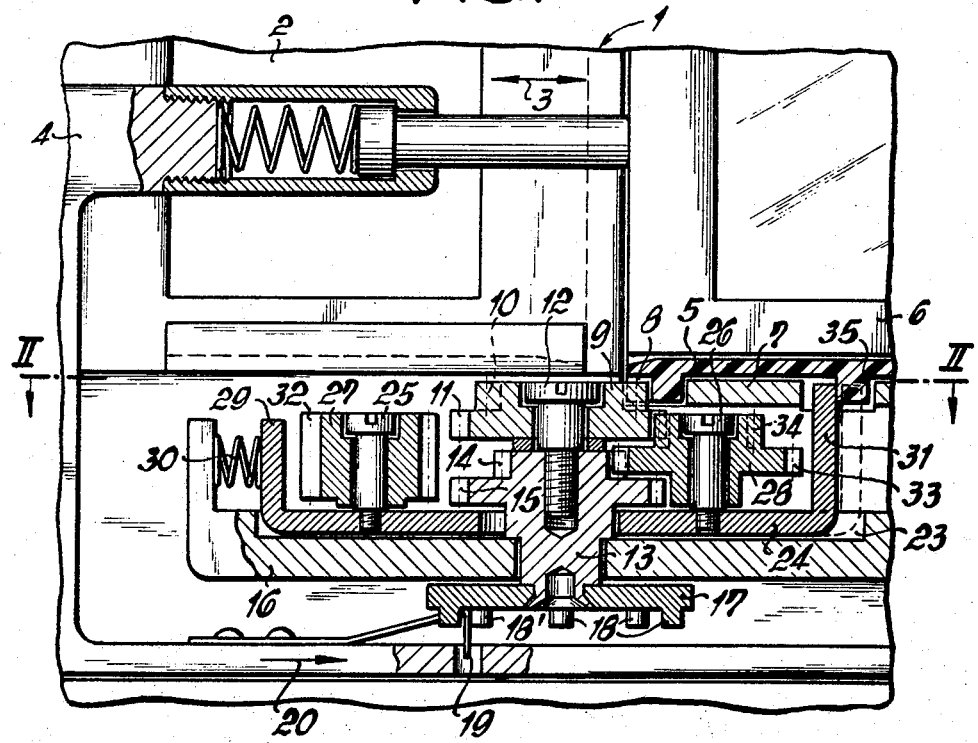

The present invention relates to photographic projectors.

In particular, the present invention relates to structure for advancing the magazine of a photographic projector.

As is well known, the magazine of a photographic projector is conventionally provided with a toothed means in the form of a rack, for example, with which an advancing gear meshes so as to advance the magazine in a stepwise manner bringing the successive slides therein into a proper position to be engaged and displaced by the slide-changing mechanism. The slide-changing mechanism itself actuates the structure which turns the magazine advancing gear through a predetermined angle which will bring the next slide into position to be displaced by the slide-changing means to a projection position after the previously projected slide has been returned to its compartment in the magazine.

With conventional projectors of the above type, the components are so designed and have with respect to each other a cooperation which in response to actuation of the slide-changing mechanism, which removes a slide from its compartment in the magazine and then returns it into the same compartment, will advance the magazine in a stepwise manner through an increment which is equal to the distance from one magazine compartment to the next magazine compartment. Projectors of this type are capable of using only a single, standard type of magazine whose magazine compartments are spaced from each other by a distance equal to the increment of advance derived from the slide-changing structure. It is not possible to use projectors of this type with special magazines which, while using a magazine of the same length as a normal magazine, will have, for example, twice the number of compartments as a normal magazine so that it is capable of accommodating slides which are mounted in extremely thin frames. Such a special magazine would, in this case, always be advanced by an increment equal to two compartments.

It is accordingly a primary object of the invention to provide for a photographic projector a magazine advancing structure which is capable of advancing different magazines by different increments in accordance with the particular spacing between the compartments of the magazine.

In particular, it is an object of the invention to provide an exceedingly simple structure which will enable different advancing increments for different magazines to be achieved.

Furthermore, it is an object of the invention to provide a photographic projector which can be operated to provide different increments of advance for different magazines while still deriving the very same magazine-advancing impulse from the slide-changing structure, so that the slide-changing structure itself need not be changed in any way.

According to the invention, the magazine means has a toothed means with which an advancing gear meshes. A driven gear means is connected with the advancing gear for rotating the latter and a driving gear means is provided for driving the driven gear means. Further, this driving gear means is not directly connected with the driven gear means. Instead a transmission means of the invention is adjustable to one of a plurality of different positions where different transmission ratios will be provided from the driving gear means to the driven gear means, so that in this way different increments of advance for the magazine means can be provided.

Figure 2:
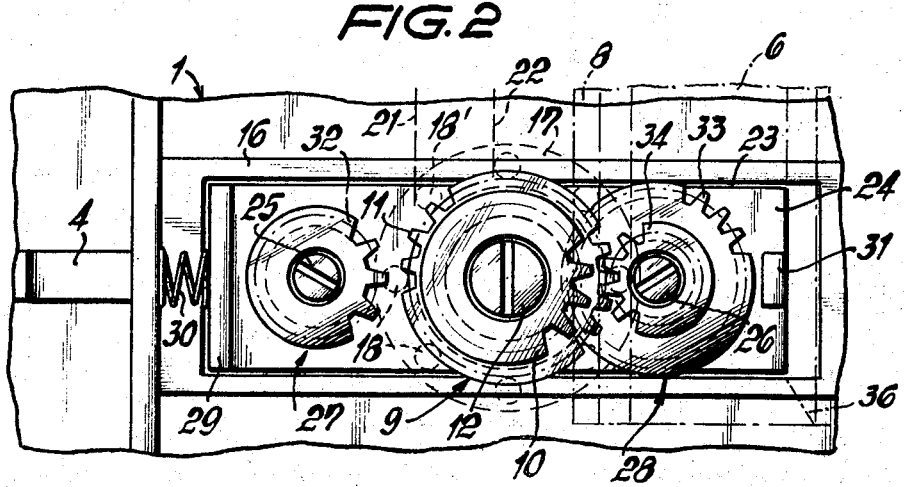

The invention is illustrated by way of example in the accompanying drawings which form part of the application and in which:

FIG. 1 is a fragmentary partly sectional front elevation of that part of a photographic projector which is provided with the structure of the invention; and FIG. 2 is a fragmentary plan view of the structure of FIG. 1 taken along line II—II of FIG. 1 in the direction of the arrows.

Referring now to the drawings, the photographic projector 1 which is fragmentarily illustrated therein is provided at an intermediate wall thereof with a projection window 2 with which the slide to be projected is aligned so that in this way an image can be derived from the particular slide which is in the projection position in alignment with the window 2. Thus, the optical axis along which the projecting light rays extend is perpendicular to the plane of FIG. 1. By means of a slide-changing structure 4, shiftable back and forth in the direction of the double-headed arrow 3, the slides are successively displaced in a known manner out of the magazine means 5 into alignment with the window 2 and then back into their respective compartments in the magazine means 5. FIG. 1 shows the parts in a position where a slide 6 has just been returned from the window 2 back into the magazine 5. In a known way the structure for advancing the magazine means through the next step is actuated by a slight further movement of the slide-changing means 4, so that the previously projected slide 6 is moved beyond the range of the slide-changer and the next slide situated in the next magazine compartment is now displaced into the operating range of the slide-changing means 4.

For this purpose the magazine means 5 is supported for movement in a direction parallel to the optical axis, so that the direction of movement of the magazine means 5 is also perpendicular to the plane of FIG. 1. This magazine means 5 is supported on a suitable guide 7 which is fixedly carried by the housing of the projector, and magazine means 5 is provided, also in a known way, with a toothed means 8 in the form of a rack with which an advancing gear 9 meshes. In conventional projectors, this advancing gear 9 is fixed with an actuating disc which is directly actuated by the slide-changer, so that at every cycle of operation of the slide-changer the advancing gear 9 will be turned through the same increment and thus will displace the magazine through a predetermined increment which of course is equal to the normal distance from one magazine compartment to the next magazine compartment.

With the structure of the invention, however, the advancing gear 9 is fixed with a driven gear which is driven from a driving gear through an adjustable transmission means enabling one of a plurality of different transmission ratios to be provided from the gear which is advanced by the slide-changer to the driven gear which is fixed to the advancing gear 9.

The advancing gear 9 has a ring of teeth 10 which mesh with the rack 8. In addition, the advancing gear 9 is coaxially fixed with a driven gear 11 which is shown as being integral with the advancing gear 9. The driven gear 11 together with the gear 9 are freely turnable on the shank of a screw 12, or the like, and this screw 12 is fixed with a drive gear 13 having driving gears 14 and 15 of different diameters coaxially arranged with respect to each other and with the driven gear 11. The driving gear means 13 is freely turnable in an opening of an intermediate wall 16 of the housing. An advancing disc 17 is fixed with the driving gear means 13 so that the latter is constrained to turn with the advancing disc 17. This advancing disc 17 carries a plurality of advancing pins 18 which are successively actuated by an advancing spring 19 which is fixed with the slide-changer 4.

In FIG. 1 the advancing spring 19 is shown in engagement with the advancing pin 18' of the advancing disc 17. During further movement of the slide-changer 4 in the direction of the arrow 20 (FIG. 1) the spring 19 will advance from the dotted line 21 shown in FIG. 2, up to the dotted line 22 shown in FIG. 2, so that in this way the pin 18' will be advanced through the angular increment clearly apparent from FIG. 2, and thus the rotation of the advancing disc 17 will be transmitted to the driving gear means 13 which will rotate through the same angle. However, it is to be noted that because the driven gear means 11 is freely turnable with respect to the driving gear means 13, the rotation of the latter will not be directly transmitted to the driven gear means 11. The rotation of the driving gear means 13 is transmitted to the driven gear means 11, and thus to the advancing gear 9, in the following manner:

The intermediate stationary wall 16 of the projector is formed at its upper surface with an elongated guide 23 in which an elongated carrier 24 is shiftable to the left and right, as viewed in the drawings. This carrier 24 carries a pair of pins 25 and 26 on which transmission gears 27 and 28 are freely rotatable. These transmission gears 27 and 28 form different gears of the transmission means for providing different transmission ratios. At its left end, as viewed in the drawings, the carrier 24 has an upwardly directed lug 29 engaged by a compressed spring 30 which thus seeks to displace the carrier 24 to the right, as viewed in the drawings, to the end position as shown in dotted lines at the right of FIG. 1 from the position shown in solid lines in FIG. 1. The end position which is indicated in dotted lines in FIG. 1 for the carrier 24 is only indicated by the dotted line position of a lug 31 at the end of the carrier 24 distant from the lug 29 thereof.

When the carrier 24 is shifted to the right from its position shown in solid lines in FIG. 1, the teeth 32 of the transmission gear 27 mesh with the gears 15 and 11 which are of the same diameter, so that the drive is transmitted from the driving gear means 13 to the driven gear means 11 by way of the single transmission gear 27. Inasmuch as the gears 11 and 15 have the same diameter, in this position of the transmission means the side-changing means will actuate the advancing gear 9 so that it turns through the same angular increment as the advancing disc 17 and the driving gear means 13 therewith. The parts are so designed that in this position the magazine will be advanced through conventional increments corresponding to the conventional distance between the compartments of a magazine which accommodates conventional slides of standard thickness.

The above-described structure is suitable, however, not only for the proper advancing of the magazine of normal size with normal slides and slide compartments, but also for the proper stepwise advance of a special magazine having compartments different from conventional compartments.

If such a special magazine is designed to accommodate relatively thin slides so that with the same length of magazine it is possible to accommodate twice the number of slides, then the increment of advance of this special magazine must be made correspondingly smaller.

This result is achieved with the structure of the invention by providing the carrier 24 with the second gear 28 of the transmission means of the invention, and when the carrier 24 is displaced to its second position shown in solid lines in FIG. 1, the transmission means is situated in this way in the other of its positions where the second gear 28 of the transmission means is operative to provide a different transmission ratio from the driving gear means 13 to the driven gear means 11. Thus, in this position of the transmission means the transmission gear 27 is displaced from the gears 15 and 11 and instead the gear portions 33 and 34 of the gear 28 respectively mesh with the gears 14 and 11. These gear portions 33 and 34 have different diameters and are designed to cooperate with the gears 14 and 11 in such a way as to provide a step-down transmission ratio. Thus, in accordance with the particular relationship between the diameters of the gears 14 and 33 as well as the gears 34 and 11, the step-down transmission ratio will be provided between the driving gear means 13 and the advancing gear 9. With the very same increment of turning of the driving gear means 13, therefore, there will be a smaller stepwise advance of the magazine means by way of the advancing gear 9, so that in this way at each increment of advance the magazine will be displaced through a smaller distance.

The shiftable carrier 24 of the transmission means of the invention can be displaced by hand into one or the other of its positions. The drawings show, however, a structure where an adjusting flange 35 is provided for shifting the carrier 24 into the solid line position shown in FIG. 1, this adjusting flange 35 being fixedly carried by the magazine 5. Such an adjusting flange 35 need only be provided on those magazines which have a compartment size and distribution different from the normal compartment size and distribution so as to require the transmission ratio from the gear 13 to the gear 11 which is derived from the gear 28 which has the gear portions 33 and 34 of different diameters. The adjusting flange 35 extends parallel to the rack 8 over the entire length of the magazine and has, as shown in FIG. 2, at one end an inclined camming surface 36. This camming surface 36 comes into engagement with the lug 31 when the magazine 5 is displaced onto the guide 7, so that the inclined camming surface 36 will engage the lug 31 and shift it to the left, as viewed in FIG. 1, thus displacing the carrier 24 in opposition to the spring 30 into the position of the transmission means where the gear 28 will become operative.

The above-described magazine-advancing structure is thus capable of being used with magazines of conventional compartment size and distribution and which are not provided with any adjusting flange, so that in this case the gears 13 and 11 will be interconnected by way of the transmission gear 27 to provide an increment of advance at each operating cycle which is proper for this particular normal magazine. When using a magazine 5 having a compartment distribution different from conventional compartment distribution, however, the adjusting flange 35 which will be included in such a magazine will automatically adjust the transmission so as to provide from the driving gear means 13 to the driven gear means 11 a transmission ratio derived from the gear 28, and now in this fully automatic manner a proper increment advance for the magazine will be provided.

It is of course possible through proper choice of the diameters of the transmission gears to provide transmission ratios different from that decribed above between the driving gear means 13 and the driven gear means 11.

Also, it is possible in accordance with the invention to provide additional gears or pairs of gears for the transmission means, so that more than two possible adjustments can be provided in response to actuations from the same slide-changing mechanism. Such additional gears or pairs of gears can be mounted on additional shiftable carriers or the like, which can be manually displaced to their proper positions or which can also be automatically displaced by structures such as the flange 35.

Furthermore, instead of providing a change in the increment of advance which is smaller than the normal increment of advance, it is possible also to provide through a suitable transmission a change in the increment of advance which is larger than the normal increment of advance for the magazine. Such a larger increment of advance is desirable, for example, when a pair of magazines are coupled, one to the next, and it is desired during the projection of the slides to provide an interruption-free transition from the last compartment of one magazine to the first compartment of the next magazine. The latter two compartments of the two magazines have, because of the larger thickness of the end walls of the magazines, a greater distance from each other, than the distance of the individual compartments in each magazine. Therefore, in this case, through corresponding enlargement of the increment of advance during transition from one magazine to the next, it is possible to achieve this transition without any interruption in the sequence of projection of the slides.

As is apparent from FIG. 1, the carrier 24 is provided at its bottom wall which is received in the guide 23 with an elongated slot through which part of the gear 13 extends, so that in this way the carrier 24 is shiftable back and forth with respect to the gear 13 whose axis remains stationary.

What is claimed is:

1. In a photographic projector, magazine means carrying toothed means by which said magazine means is advanced, driven gear means meshing with said toothed means, driving gear means for driving said driven gear means, adjustable transmission means coacting with said driving and driven gear means for transmitting a drive from said driving gear means to said driven gear means at one of a plurality of different transmission ratios, slide-changing means coacting with said magazine means for sequentially displacing each of a series of slides therein out of said magazine means to a projecting position and then back into said magazine means during operation of said slide-changing means through a predetermined cycle, said slide-changing coacting with said driving gear means for turning the latter through a given angular increment at each operating cycle of said slide-changing means, said driving and driven means respectively including rotary gears of the same diameter, and said transmission means having in one position a single gear meshing with both of said gears of the same diameter of said driving and driven gear means for providing a rotation of said driven gear means which is the same as that of said driving gear means, one of said gear means having a second gear of a diameter substantially different from said first-mentioned gear thereof, and said transmission means having a second position and including a pair of additional coaxial gears which rotate together and which are of different diameters and respectively mesh with the other of said gear means and said second gear of said one gear means for providing between said driving and driven gear means a transmission ratio different from that provided by said transmission means in said first-mentioned position thereof.

2. The combination of claim 1 and wherein said driving gear means has said second gear and said transmission means in said second position thereof providing a transmission from said second gear of said driving gear means to said driven gear means.

3. The combination of claim 1 and wherein said transmission means includes a shiftable carrier carrying said gears of said transmission means and shiftable between said positions for respectively providing the different transmission ratios.

4. The combination of claim 3 and wherein a spring means engages said carrier for urging said transmission means to one of its positions, and said magazine means when requiring a transmission ratio different from that provided by said transmission means in said latter one of its positions carrying a control member which engages and shifts said carrier in opposition to said spring means to place said transmission means automatically in the other of its positions.

5. In a photographic projector, magazine means carrying toothed means by which said magazine means is advanced, an advancing gear meshing with said toothed means, a driven gear coaxially fixed with said advancing gear for rotation therewith, a first drive gear of the same diameter as said driven gear coaxial with said driven gear but freely rotatable with respect thereto, a second drive gear of a smaller diameter than said first drive gear and coaxially fixed thereto for rotation therewith, a first transmission gear having an operative position meshing with said first drive gear and said driven gear for driving the latter through the same angle as said first drive gear, a second transmission gear having one gear portion meshing with said second drive gear and another gear portion meshing with said driven gear for driving said driven gear at a transmission ratio different from that with which said first drive gear is rotated, a carrier carrying said transmission gears, and means supporting said carrier for shifting movement between positions where either said first transmission gear is in its operative position or said second transmission gear is in an operative position, so that said magazine may be selectively advanced with different transmission ratios, respectively.

6. In a photographic projector, magazine means carrying toothed means by which said magazine means is advanced, driven gear means meshing with said toothed means, driving gear means for driving said driven gear means, adjustable transmission means coacting with said driving and driven gear means for transmitting a drive from said driving gear means to said driven gear means at one of a pair of different transmission ratios, means normally maintaining said adjustable transmission means at one position providing one of said transmission ratios, and means carried by a magazine means which requires the other of said transmission ratios for automatically displacing said transmission means to a second position providing the other of said transmission ratios.

References Cited

UNITED STATES PATENTS

| | | | |
|---|---|---|---|
| 1,442,217 | 1/1923 | H'Doubler | 74—352 |
| 3,160,972 | 12/1964 | Hall | 40—79 |

DONLEY J. STOCKING, *Primary Examiner.*

H. S. LAYTON, *Assistant Examiner.*

U.S. Cl. X.R.

74—352